Dec. 9, 1930.  G. A. DARBY  1,783,957
ROLLER BEARING
Filed Aug. 12, 1927  2 Sheets-Sheet 2

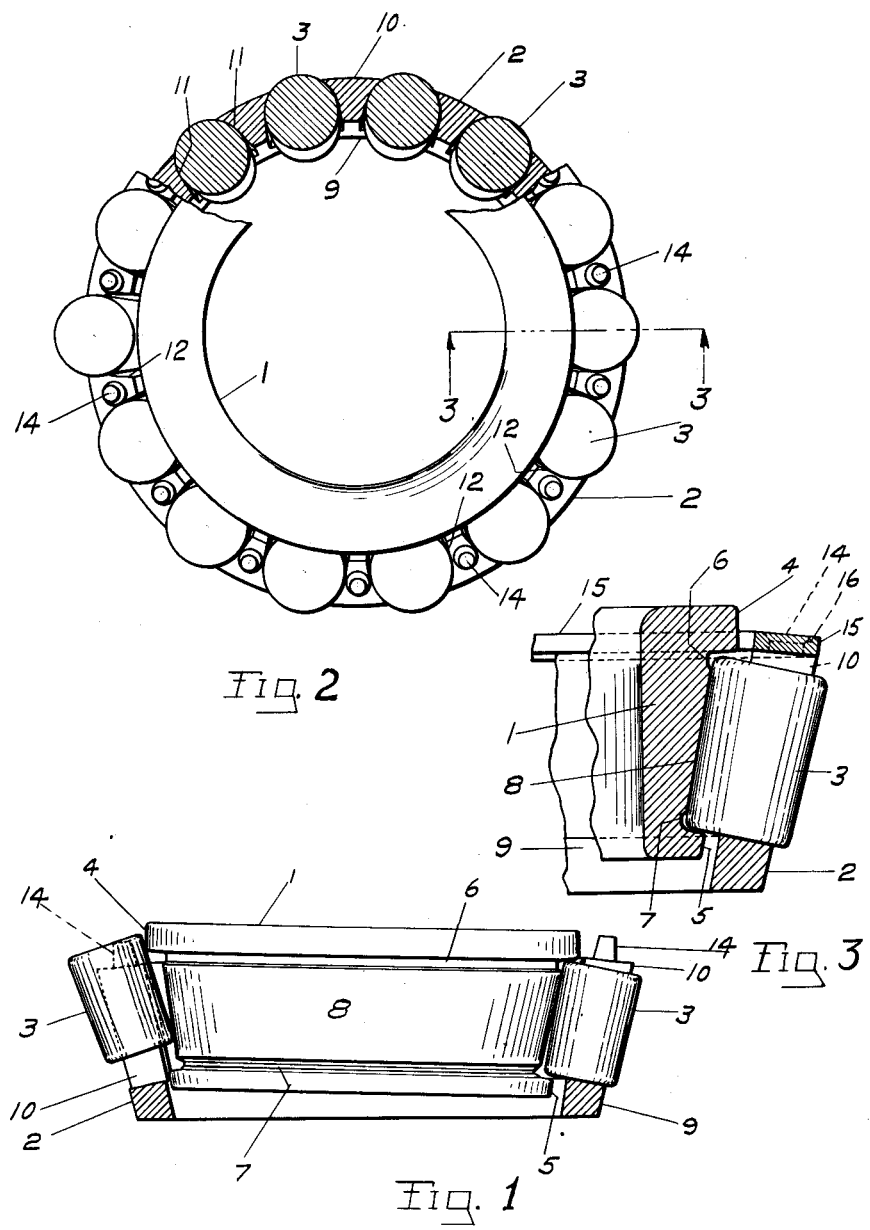

INVENTOR
George A. Darby
BY
William A. Hardy
his ATTORNEY

Patented Dec. 9, 1930

1,783,957

UNITED STATES PATENT OFFICE

GEORGE A. DARBY, OF EAST ORANGE, NEW JERSEY, ASSIGNOR TO ORANGE ROLLER BEARING COMPANY, OF ORANGE, NEW JERSEY, A CORPORATION OF NEW JERSEY

ROLLER BEARING

Application filed August 12, 1927. Serial No. 212,391.

My invention relates to anti-friction bearings and more particularly to roller bearings of the type wherein an annular series of spaced rollers having converging axes is disposed between two annular concentric conical bearing surfaces, such roller bearings being commonly referred to as tapered or conical roller bearings.

One of the objects of my invention is to provide an improved spacing means or cage structure for the rollers of a tapered roller bearing, preferably comprising a strong and rigid cage body having spaced roller guiding portions or bridges providing pockets with extended seats or wraps for the rollers to thereby insure proper alignment of the rollers being maintained throughout the life of the bearing; the construction of said cage body preferably being such that it is capable of being produced in finished integral form, with no machining thereof necessary, in a single casting operation.

Another object of my invention is to provide a cage having a body of this character preferably consisting of a die casting and formed of a special material which is not only strong and highly wear resistant, but also very light, whereby the operation of bearings provided with such cages will be improved and the wear in the bearings greatly reduced.

A further object of my invention is to provide an improved roller bearing device, which is of strong and simplified construction and comprises an inner bearing sleeve or cone and a spacing cage wherein the bearing rollers are mounted, and all parts of which are irremovably retained in proper assembled relation so that such device may be handled and installed as a unit.

A still further object of my invention is to provide a roller bearing device or unit of the character just described, in which the assembling of all the parts, including the disposing of the rollers in the pockets of the spacing cage, may be quickly and easily effected, and this without distortion or deformation of the roller guiding portions or bridges of the cage or of other parts of the structure.

Other objects and features of my invention will be hereinafter more fully described and claimed.

For a clearer understanding of my invention, attention is directed to the drawings accompanying and forming part of this specification, and in which:

Figure 1 is a view in side elevation, partly in section, of a preferred form of my improved roller bearing device or unit with the separate end ring of the spacing cage removed, showing how the bearing rollers may be inserted in the pockets of the cage in assembling the device;

Fig. 2 is a plan view, partly broken away and partly in section, of the bearing device shown in Fig. 1;

Fig. 3 is an enlarged sectional view of the bearing device, taken on line 3—3 of Fig. 2, but showing the separate end ring applied to the cage body;

Figure 4:
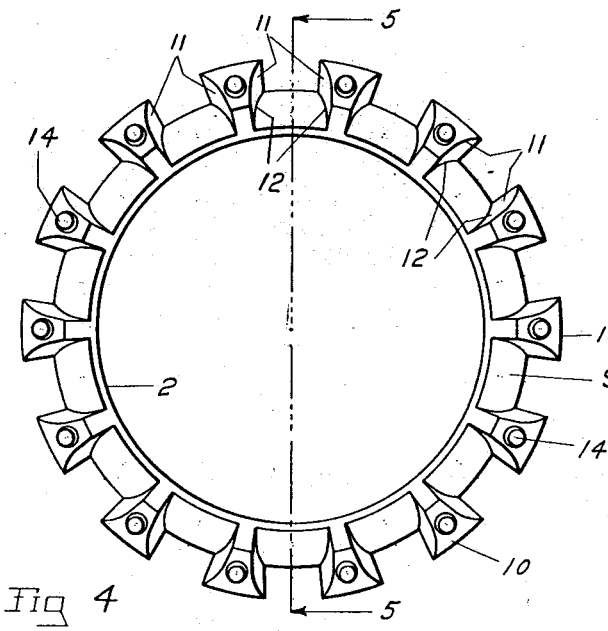
Fig. 4 is a plan view of the roller spacing means or cage body of the bearing device shown in Figs. 1 and 2.
Figure 5:
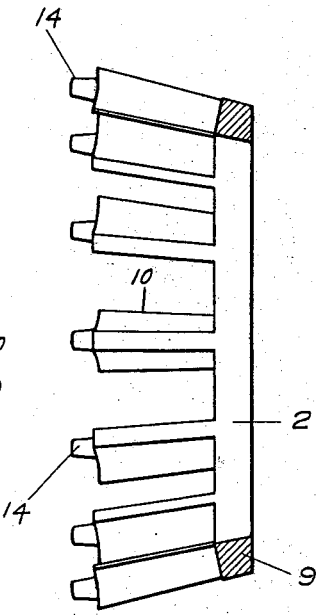
Fig. 5 is a sectional view taken on line 5—5 of Fig. 4.
Figure 6:
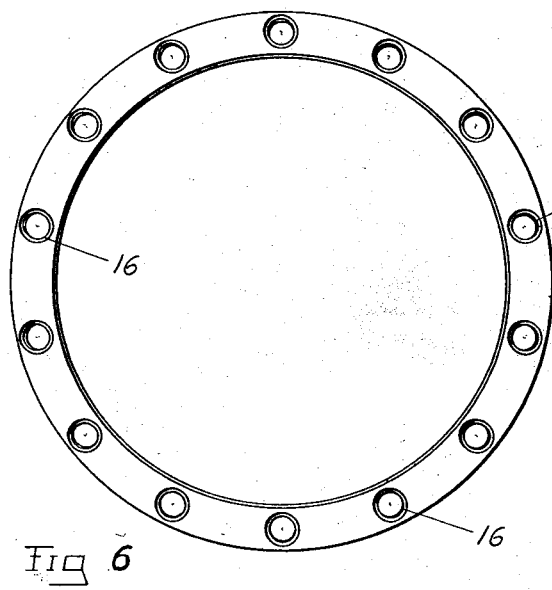
Fig. 6 is a plan view of the separate end ring of the roller cage.
Figure 7:
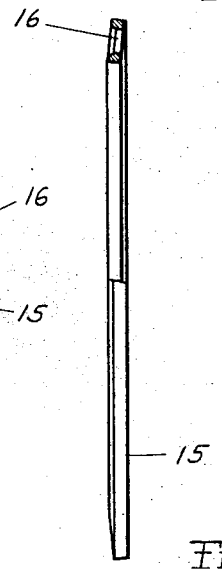
Fig. 7 is a view in side elevation, partly in section, of the separate end ring of the roller cage.

Referring to the drawing and especially to Figs. 1 and 2, the bearing structure or device shown comprises an inner bearing sleeve cone 1, and a spacing cage 2 having an annular series of roller pockets in which the conical rollers 3 are disposed. The cone 1 is provided with integrally formed upper and lower annular lips or flanges 4 and 5 and is annularly recessed or grooved, as indicated at 6 and 7, adjacent such flanges so as to provide an annular conical bearing surface 8 between the recesses which is slightly less in width than the length of the rollers 3. When the structure is assembled the bearing rollers 3 slightly overlap the edges of the conical bearing surface 8 and such bearing surface will consequently wear evenly and without grooving in the operation of the bearing.

The body of the cage 2, consisting of the entire cage with the exception of the separate upper or larger end retaining ring 15, is integral and may be formed of a single forging or casting. Preferably, however, this cage body consists of a single die casting which is cast in finished form from a special alloy which is not only exceedingly light, but is also very strong and tough and possesses lubricating qualities. The formation of the cage body of this special alloy is an important feature of my invention, and the characteristics of such alloy and the advantageous results obtained by its use will be hereinafter more fully described. The cage body comprises a lower or smaller end retaining ring 9 and an annular series of uniformly spaced bearing bridges or posts 10 inclining upwardly and outwardly from the ring 9 and providing therebetween an annular series of roller pockets 11. The bridges 10 are of uniform size and shape and so spaced that when the rollers 3 are disposed in the pockets 11 they will extend outwardly from the cage a slight distance for engagement with the outer raceway, not shown, but consisting of the usual ring cup having an inner conical bearing face. The bridges 10 are so constructed that the opposed faces of each pair of adjacent bridges are curved from their outer edges inwardly to points located just slightly outwardly of the pitch line of the rollers 3 and so as closely to conform to and provide extended seats or wraps for the rollers. The bridges 10, however, extend inwardly throughout their length a considerable distance beyond the pitch line of the rollers 3, and such inwardly projecting portions of each pair of adjacent bridges are formed so as to provide clearances therebetween and the roller disposed in the corresponding pocket, such clearances being clearly shown in Fig. 2. To provide such clearances the opposed surfaces 12 of the inwardly projecting portions of each pair of adjacent bridges 10, that is of those portions of the bridges which extend from the curved roller seats inwardly beyond the pitch line of the rollers, are made slightly flared, being preferably formed to lie in planes substantially tangential to the respective curved surfaces of the outer portions of the pockets 11 at their innermost points. The construction of the bridges 10 and the formation of the roller pockets provided by the bridges, as just described, renders it feasible to form the cage body of a single die casting, for by reason thereof, the metal core necessarily used in the casting operation may be readily withdrawn when the casting has set. Moreover, with such construction and formation of the bridges and roller pockets of the cage 2, the bearing structure or device shown may be readily assembled with all the rollers mounted in the cage, without in any way distorting or deforming the cage or any other part of the structure, for it is then possible easily to insert the rollers 3 in the pockets 11, while the cone 1 is disposed within the cage body, merely by slightly lifting and tilting the cone and dropping the rollers into the pockets, as shown in Figs. 1 and 2.

The bridges or posts 10 of the cage are provided at their upper or free ends with reduced projections 14 serving to secure the larger end retaining ring 15 of the cage to the cage body. This retaining ring 15 is provided with a series of uniformly spaced countersunk openings 16, and after all the rollers 3 have been inserted in the pockets 11, with the cone 1 disposed within the cage body, the ring 15 is positioned against the upper ends of the bridges 10 with the projections 14 of the latter engaging the openings 16 of the ring, and the projections 14 are then peaned over to firmly secure the ring in position, as shown in Fig. 3. This completes the assembly of the roller bearing device and renders the same a unitary structure, for the lips or flanges 4 and 5 of the cone 1 and the retaining rings 9 and 15 of the cage 2 then coact with the rollers 3 to hold all parts of the device irremovably assembled in proper operative relation.

As stated above, the main body portion of the cage consisting of the end ring 9 and the bridges 10, is preferably formed of a single die casting. This renders it possible to finish the cage complete, except for the separate end ring 15, with roller pockets having smooth finished surfaces and requiring no machining, in one casting operation, and accordingly materially lessens the cost of production of the cage. This has heretofore been impracticable because of the characteristics of the alloys ordinarily employed in die casting, such alloys, while light, being generally weak, brittle and very susceptible to wear. The special alloy which I employ in producing my improved cage body, however, is not only very light, but is also strong, tough, and highly wear resistant; furthermore, it possesses lubricating qualities and the use thereof results in a much quieter running bearing. This special alloy contains aluminum, copper, nickel and either small percentages of magnesium and silicon, or a small percentage of a special metallic material obtainable from Germany, which contains both magnesium and silicon and is known by the trade name "Timosin", preferably the latter. The aluminum content of such an alloy should be at least eighty-two percent (82%) by weight, and best results are found to be obtained with an alloy containing approximately ninety-two percent (92%) by weight of aluminum, approximately three percent (3%) by weight of copper, approximately four percent (4%) by weight of nickel and approximately one percent (1%) of either magnesium and silicon or of "Timosin". An alloy of the composition last described is about only one-sixth of the weight of steel and bronze which are the materials usually employed for roller cages, and it is therefore entirely feasible to provide my improved cage with the very substantial sized spacing bridges 10 having substantially the maximum practicable width in a radial direction, for even then the cage is much lighter than the cages heretofore used. While my improved cage, as noted above, is highly wear resistant because of the strength, toughness and lubricating qualities of the alloy from which the main body of the cage is formed, the wear on the cage and especially on the roller bearing surfaces of the spacing bridges thereof, is very materially reduced by reason of its small inertia; for as the cage is carried around by the rollers in the operation of the bearing, the pressures necessarily exerted on the sides of the roller pockets 11 by the engagement of the rollers therewith in overcoming the inertia of the cage when the speed of operation of the bearing changes and in overcoming the action of centrifugal force will be relatively small.

My improved unitary bearing structure or device also has advantages in addition to those already mentioned. It can be easily assembled, and as the roller pockets of the cage provide an extended wrap or bearing for each of the rollers, and are subject to but little wear, the rollers will be effectively maintained in proper alignment during a much longer period of operation of the bearing and the life of the bearing will therefore be increased.

While I have described a preferred form of my invention, it is to be understood that the same is subject to various changes and modifications without departure from the spirit of the invention and the scope of the appended claims.

Having now described my invention, what I claim as new and desire to protect by Letters Patent is as follows:

1. A conical cage for the rollers of a tapered roller bearing comprising annular ends and connecting spaced bridges providing roller pockets, each pair of adjacent bridges having opposed curved bearing surface portions extending from the periphery of the cage inwardly almost but not quite to the roller pitch line and closely conforming to and providing seats for the rollers for which the cage is adapted, and also having opposed flare surface portions respectively extending inwardly from and in planes substantially tangential to the said curved surface portions at their innermost points.

2. A roller bearing structure comprising an inner bearing cone having outwardly extending lips or flanges at its ends and a conical bearing surface intermediate said flanges, an annular series of conical rollers disposed about said bearing surface, and a conical cage carried by said rollers, said cage comprising an end ring, spaced bridges extending from said ring and formed integrally therewith and a larger and separate end ring secured to the free ends of said bridges, each pair of adjacent bridges of the cage having opposed curved bearing surface portions extending from the periphery of the cage inwardly substantially to the roller pitch line and closely conforming to and providing seats for the rollers, and also having opposed flared surface portions respectively extending inwardly from said curved surface portions.

3. An integral conical cage body for tapered roller bearings comprising an annular end and spaced bridges extending from said end, each pair of adjacent bridges having opposed curved bearing surface portions extending from the periphery of the cage body inwardly almost but not quite to the roller pitch line and providing a conical seat for one of the rollers for which the cage body is adapted, each such pair of adjacent bridges also having opposed flared surface portions respectively extending inwardly from the innermost points of said curved surface portions.

4. A conical cage body for tapered roller bearings comprising an end ring and spaced bridges providing roller pockets therebetween and extending from said ring, each roller pocket having outer opposed surface portions extending inwardly almost but not quite to the roller pitch line and curved to conform to the rollers for which the cage body is adapted and inner opposed flared surface portions respectively extending from said outer curved surface portions inwardly beyond the roller pitch line.

5. A roller bearing structure comprising an inner bearing cone having outwardly extending lips or flanges at its ends, a conical bearing surface intermediate said flanges of a width less than the length of the rollers of the structure, and annular grooves between the ends of such bearing surface and the adjacent lips or flanges respectively, an annular series of conical rollers disposed about said bearing surface, and a rigid non-deformed conical cage carried by said rollers, said cage comprising an end ring, spaced bridges extending from said ring and formed integrally therewith and a larger and separate end ring secured to the free ends of said bridges, each pair of adjacent bridges of the cage having opposed curved bearing surface portions extending from the periphery of the cage inwardly not quite to the roller pitch line and closely conforming to and providing seats for the rollers, and also having opposed flared surface portions respectively extending inwardly from said curved surface portions beyond the roller pitch line, the end flanges of said cone and the end rings of said cage coacting with said rollers to hold all parts of the structure irremovably assembled in proper operative relation.

This specification signed this 9th day of August, 1927.

GEORGE A. DARBY.